(12) United States Patent
Chu

(10) Patent No.: US 10,122,158 B2
(45) Date of Patent: Nov. 6, 2018

(54) CORRUGATED PLASTIC TUBE FOR ENCASING WIRES

(71) Applicant: Schlemmer GmbH, Poing (DE)

(72) Inventor: Van Ngoc Chu, Poing (DE)

(*) Notice: Subject to any disclaimer, the term of this patent is extended or adjusted under 35 U.S.C. 154(b) by 0 days.

(21) Appl. No.: 15/559,809

(22) PCT Filed: Mar. 18, 2016

(86) PCT No.: PCT/EP2016/055930
§ 371 (c)(1),
(2) Date: Sep. 19, 2017

(87) PCT Pub. No.: WO2016/150839
PCT Pub. Date: Sep. 29, 2016

(65) Prior Publication Data
US 2018/0048131 A1 Feb. 15, 2018

(30) Foreign Application Priority Data
Mar. 20, 2015 (DE) .................. 10 2015 104 256

(51) Int. Cl.
H02G 3/04 (2006.01)
(52) U.S. Cl.
CPC .................. H02G 3/0468 (2013.01)
(58) Field of Classification Search
CPC .................................................. H02G 3/0468
(Continued)

(56) References Cited

U.S. PATENT DOCUMENTS

| 5,350,885 A * | 9/1994 | Falciglia | H01B 7/365 156/50 |
| 5,799,703 A | 9/1998 | Kanao et al. | |

(Continued)

FOREIGN PATENT DOCUMENTS

| CN | 202597938 U | 12/2012 |
| CN | 203553861 U | 4/2014 |
| CN | 103928898 A | 7/2014 |
| DE | 19700916 A1 | 7/1998 |
| DE | 19904977 A1 | 8/2000 |
| DE | 69801014 T2 | 3/2002 |
| EP | 0882925 A2 | 12/1998 |
| EP | 2182599 A1 | 5/2010 |

OTHER PUBLICATIONS

ISA European Patent Office, International Search Report and Written Opinion Issued in PCT Application No. PCT/EP2016/055930, dated Jun. 10, 2016, WIPO, 12 pages. (Submitted with English Translation of International Search Report).
(Continued)

*Primary Examiner* — Dhirubhai R Patel
(74) *Attorney, Agent, or Firm* — Alleman Hall Creasman & Tuttle LLP

(57) ABSTRACT

The invention relates to a corrugated tube made of flexible plastic for encasing wires, having circumferential, successively alternating corrugation crests and corrugation troughs distributed over the axial length thereof, wherein the corrugation crests, seen in cross-section, perpendicular to the longitudinal axis of the corrugated tube, each have a corrugation along the outside circumference thereof which forms alternating radially protruding regions and radially inward-offset regions in the circumferential direction of each corrugation crest. The corrugated tube has wall sections, which extend axially over the length thereof and lie adjacent to each other in the circumferential direction, of which wall sections one forms the radially protruding regions in the corrugation and the other forms the radially inward-offset regions. Said wall sections consist of materials of varying hardness in circumferential alternation.

11 Claims, 2 Drawing Sheets

(58) Field of Classification Search
USPC ........................................................ 174/68.3
See application file for complete search history.

(56) References Cited

U.S. PATENT DOCUMENTS

| | | |
|---|---|---|
| 6,078,009 A | 6/2000 | Kawamura |
| 6,079,451 A | 6/2000 | Hegler |
| 6,199,918 B1* | 3/2001 | Gerich ................ F16L 25/0045 285/308 |
| 6,323,425 B1 | 11/2001 | Hegler et al. |
| 2011/0236614 A1 | 9/2011 | Ushikai et al. |
| 2014/0130930 A1 | 5/2014 | Ragner |

OTHER PUBLICATIONS

State Intellectual Property Office of the People's Republic of China, Office Action and Search Report Issued in Application No. 201680016849.5, dated Jun. 29, 2018, 12 pages.

* cited by examiner

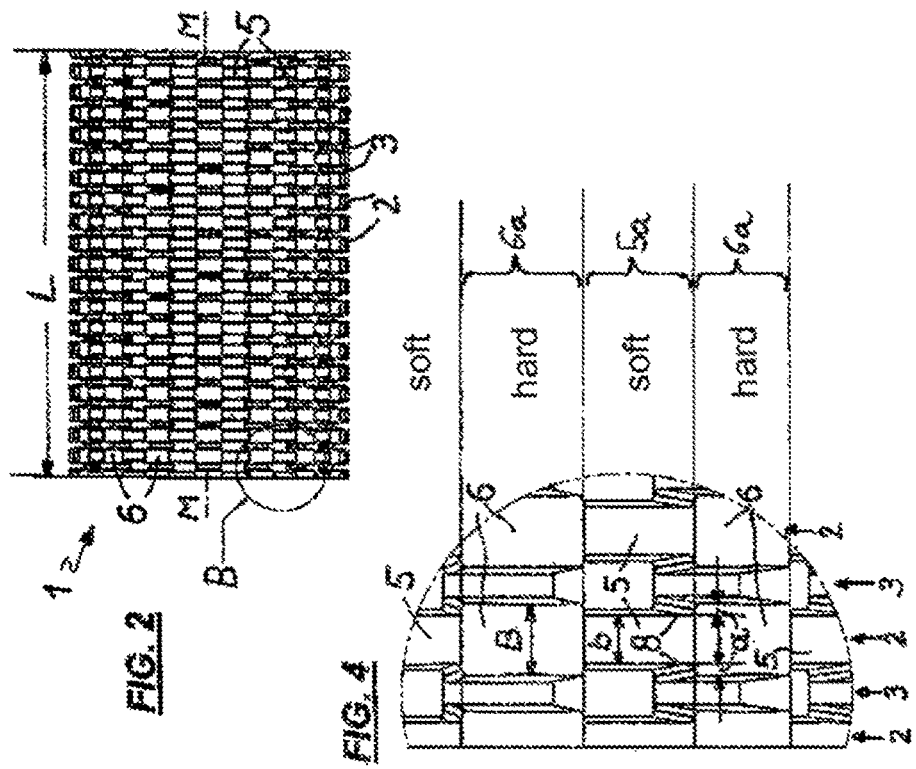
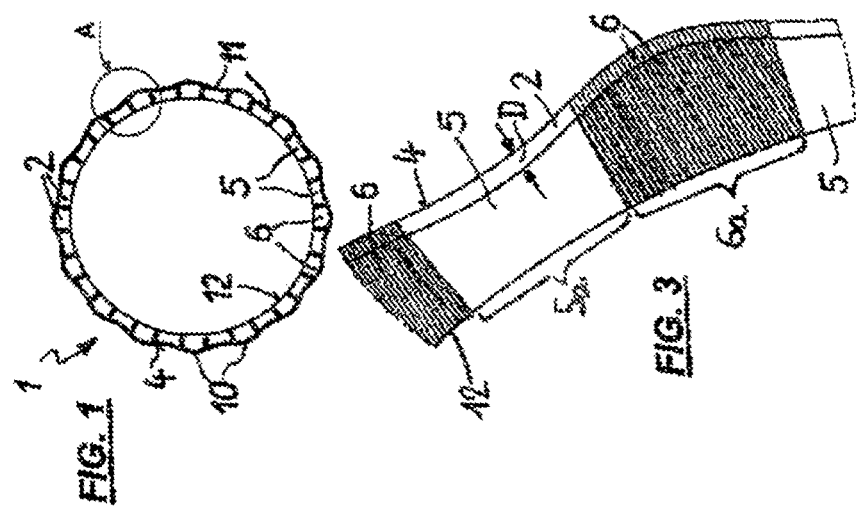

CORRUGATED PLASTIC TUBE FOR ENCASING WIRES

BACKGROUND OF THE INVENTION

The invention relates to a corrugated tube made of flexible plastic material for encasing lines, having circumferential peaks and troughs distributed in alternating succession over its axial length.

Corrugated tubes of this type are used in a wide variety of fields of application, for example in the automotive industry, where cables or cable looms, lines or the like are accommodated in their interior and are protected against unwanted external influences by the corrugated tube surrounding them.

In the case of fields of application where moving applications of such corrugated tubes are concerned, such as in robotics when laying lines along robot arms or also in the case of bus joints whose joint play continuously acts on the laid corrugated tubes, there is a requirement that the corrugated tubes used must have great flexibility on one hand and, on the other hand, high abrasion resistance. However, these are contradictory requirements for the materials for the corrugated tubes. Materials with high flexibility generally have a high adhesion and, as a result, poor abrasion resistance, while materials with high abrasion resistance generally have low friction and relatively high hardness. These difficulties mean that such fields of application usually require the use of multi-part solutions for the corrugated tubes to be used here.

BRIEF SUMMARY OF THE INVENTION

Proceeding from this point, the invention is based on the object of providing an improved corrugated tube, in particular of proposing a structure for a flexible corrugated tube made of plastic, which has no multi-part construction and, in use, fully fulfills the above-stated requirements of high flexibility and, at the same time, good abrasion resistance, in a particularly effective manner.

Accordingly, in the case of a corrugated tube of the type mentioned in the introduction, this is achieved in that the peaks are each provided, as seen in cross section perpendicular to the longitudinal axis of the corrugated tube with a circumferential corrugation along their outer circumference, which corrugation alternately forms, in the circumferential direction of each peak, radially projecting regions and radially recessed regions, and that the corrugated tube comprises wall sections arranged adjacent to one another in the circumferential direction and extending axially over the length of the tube, one of which forms the radially projecting regions in the corrugation and the other forms the respective radially recessed regions, these wall sections consisting, circumferentially alternately, of materials of different hardnesses.

Thus, a corrugated tube is provided which has an outer bearing surface or a plurality of outer bearing points which is harder or softer than other parts of the corrugated tube so as to achieve a higher abrasion resistance (hard bearing surface) despite a high elasticity of the corrugated tube, or a better adhesion (soft bearing surface) in spite of the higher stiffness of the corrugated tube.

According to one embodiment, it is provided that the wall sections forming the radially projecting regions are each made of a material which is harder than the material of the other wall sections forming radially inner regions.

According to a further embodiment, the wall sections lie parallel to one another in the circumferential direction.

In the case of the corrugated tube, a construction with two materials of different hardnesses is therefore preferably used, wherein in use the material with the lower hardness determines the flexibility of the corrugated tube and the material with the greater hardness determines the abrasion resistance of the corrugated tube. In that context, the basic construction of the corrugated tube is preferably designed in such a way that, in the installed and laid state, only those wall sections formed from the harder material are in frictional contact with the movable friction counterpart on which the corrugated tube is laid, those wall sections with the harder material being formed over the outer circumference of the corrugated tube as longitudinal sections projecting radially and extending axially which, as a result of their projecting radially, form the frictional contact with the corresponding counter-surface.

However, the other wall regions of the corrugated tube, which in contrast are offset radially inwards, do not come into abutment against the friction partner because of this offset, so that they preferably effect good flexibility of the corrugated tube due to their material of lower hardness, without a friction effect and the resulting abrasion.

Due to the fact that, in the case of the corrugated tube, preferably different materials are responsible for the functions of abrasion resistance on one hand and flexibility on the other, the corresponding wall sections of the corrugated tube can be designed by selecting suitable materials such that the material in question meets the stated requirements of abrasion resistance or flexibility in a precisely targeted manner, without the respective other requirement having to be taken into account.

Since there is not only provision made, preferably on the outer circumference of the corrugated tube, of circumferential peaks and troughs alternating in the longitudinal direction of the tube, but also a circumferential corrugation is likewise formed there as seen in the circumferential direction of each peak, this means that, along the outer circumference of the circumferential peaks, there is always, between two successive wall regions with harder material, an intermediate radially recessed wall region with softer material, which provides very good flexibility in particular not only in the axial direction of the corrugated tube but also in the circumferential direction thereof.

In many applications, it has proved to be particularly advantageous if the softer material is a plastic with a Shore A hardness in the range from 10 to 70 and/or, also preferably, the harder material is a plastic with a Shore D hardness in the range from 40 to 90.

Preferably, the harder material is a suitable polypropylene (PP) or polyamide and the softer material is a thermoplastic elastomer (TPE).

An advantageous embodiment also consists in that the wall sections of the corrugated tube each locally form the entire wall thickness thereof in the radial direction.

In a different but also advantageous embodiment, it can however also be provided that the wall sections made of harder material in each case extend in the radial direction of the corrugated tube only over a part of the wall thickness thereof, while the rest of the corrugated tube is made of the softer material. In this case, the harder material in the wall section which it forms can also extend to different radial extents into the wall thickness of the corrugated tube, as seen in the circumferential direction of this wall section, but the harder material extends furthest into the wall thickness of the corrugated tube in the middle section of the breadth of this wall section.

The number of wall sections made of softer material and of harder material, which are distributed over the circumference of the corrugated tube, can in particular be selected according to the requirements of the particular application. It has proved to be very advantageous, and very suitable for many applications, in particular for the number of wall sections of both materials to be 12 or 16, respectively.

A further advantageous embodiment of the corrugated tube consists in that the radially projecting regions of the wall sections which are in the circumferential corrugation of the peaks and are made of harder material have, as seen in the axial direction of the corrugated tube, a breadth which is greater than that of the adjoining wall sections made of softer material. This allows particularly large, locally effective friction surfaces to be created, as a result of which, in the case of friction, the compressive load on the surfaces which rub against one another is reduced, and as a result the resulting abrasion can also be reduced.

Preferably, those regions of the wall sections made of harder material which project radially in the circumferential corrugation of the peaks, on their sides facing the adjacent wall sections made of softer material, as seen in the circumferential direction, are connected on both sides, via a respective radially oriented axial setback, to the respectively facing side flank of the adjacent wall section made of softer material, whereby the wave breadth of the area with a harder material is greater than in the area of the adjacent wall section made of softer material. It has been found that, in many cases, an axial setback of about 0.5 mm between both regions is recommended.

The corrugated tube avoids the necessity of a multi-part structure, which had previously proved to be necessary in particular in moving applications. In addition, the corrugated tube is also of a relatively simple design and can easily be produced in the known extrusion technology by co-extrusion. In that process, the soft material is extruded from a main extruder and the harder material is extruded from an ancillary extruder. The melt of the soft material coming from the main extruder is fed to a torpedo, where it is expanded annularly, a plate distributor being interposed between the torpedo and the spray nozzle, into which distributor the ancillary extruder introduces the melt of the harder material. The plate distributor then introduces the melt of the hard material into the passing flow of the softer material via various outlets, locally displacing the softer material during the introduction. In the softer material, the radial penetration depth of the harder material can be controlled by its temperature and pressure. A blank is produced for a corrugated tube with axial strips of harder material, which can then be fed to a downstream corrugator for forming the final shape of the corrugated tube. After passing through the corrugator, the corrugated tube has corrugated axial strips of harder material and corrugated axial strips of softer material. The corresponding corrugations have a propagation direction in the axial direction of the corrugated tube.

BRIEF DESCRIPTION OF THE DRAWINGS

The embodiments of the invention will be explained below in more detail in principle and by way of example with reference to the drawings, in which:

FIG. 1 is a front view of a corrugated tube;
FIG. 2 is a side view of the corrugated tube of FIG. 1;
FIG. 3 shows the enlarged detail A from FIG. 1;
FIG. 4 shows the enlarged detail B from FIG. 2.

DETAILED DESCRIPTION OF THE INVENTION

Figure 5:
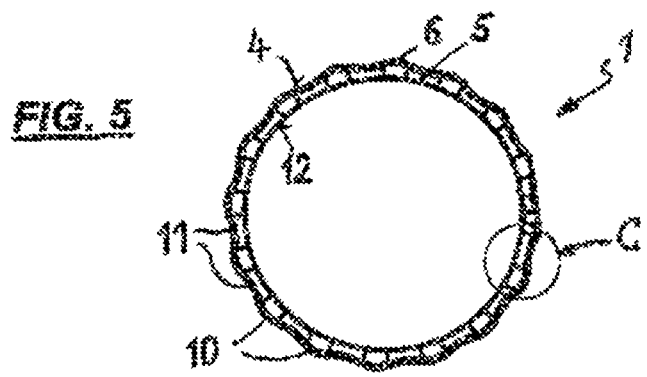
FIG. 5 is a front view of another embodiment of a corrugated tube.

A corrugated tube 1 with a longitudinal central axis M-M is shown in a front view in FIG. 1 and in a side view in FIG. 2. In practice, such corrugated tubes are frequently used for accommodating lines, cables or the like, which are, however, omitted in the figures.

FIG. 2 shows that the corrugated tube 1 is provided with alternatingly successive, respectively circumferentially extending peaks 2 and troughs 3 distributed over its axial length L.

In the front view of FIG. 1, the radial outer circumference, represents the outer circumference of the peaks 2, and FIG. 1 also shows that the peaks 2 at their radially outer circumference, as seen in the circumferential direction thereof, are provided with a circumferential corrugation 4. In this case, alternately radially projecting sections 10 and radially recessed sections 11 are formed by this corrugation 4 on each peak 2, as seen in the circumferential direction, wherein, in the case of the corrugated tube 1 shown in FIGS. 1 and 2, there are formed along a circumference, respectively 16 radially projecting sections 10 and, between these, 16 radially recessed sections 11.

Instead, however, a different number of such radially projecting sections 10 and radially recessed sections 11 could also be formed on the outer circumference of each peak 2, for example only 12 or only 8, but also more than 16. The number of radially projecting sections 10 and radially recessed sections 11 can be suitably selected according to the requirements of the application area for which the corrugated tube 1 is intended.

The circular inner circumferential line 12 of the corrugated tube 1 shown in FIG. 1 reproduces the—in particular circular—inner circumference of the troughs 3 in the interior of the corrugated tube 1.

As also shown in FIG. 1, the corrugated tube 1 consists of individual wall sections 5 and 6, which are connected to one another and arranged side by side, each of which, as seen in the longitudinal direction of the corrugated tube 1, extends axially over the entire length L thereof, wherein the wall sections 5 form in each case the radially recessed regions in the corrugation 4, and the wall sections 6 form the radially projecting regions in the corrugation 4. In that context, the wall sections 5, which form the radially inner regions, consist of a flexible elastic plastic which has a different hardness to the flexible elastic plastic of the adjacent wall sections 6, which form the radially projecting sections of the corrugated tube 1, namely such that the material of the radially projecting wall sections 6 is harder than the material of the radially recessed sections 5.

FIG. 3 shows the detail A from FIG. 1 in a radially greatly enlarged detail view, and in a schematic form:

FIG. 3 shows the radial wall thickness D of a peak 2 which is provided with the corrugation 4 over its radial outer circumference. FIG. 3 shows, schematically, the wall sections 5 and 6 that are adjacent to one another in the circumferential direction of the corrugated tube 1, the wall sections 6 of harder plastic being shown in hatched lines, while the wall sections 5 adjoining these walls on both sides are made of softer plastic and are shown without hatching.

As a consequence of the circumferential corrugation 4 on each peak 2, the wall sections 5 made of softer material and the wall sections 6 made of harder material are arranged circumferentially in alternation next to one another.

FIG. 4 shows the detail B from FIG. 2 in a detail side representation at a high magnification, wherein the axially extending wall sections 5 of soft material and the wall sections 6 of harder material, lying side by side in the radial direction, are expressly indicated. Thus, corrugated axial strips 6a of harder material and corrugated axial strips 5a of softer material are formed in the longitudinal direction of the corrugated tube 1. The wall of the corrugated tube 1 is preferably formed entirely from alternately and adjacently arranged strips 5a, 6a integrally connected to one another. For example, 8-16 (or even more or less) of such strips 5a, 6a can form the wall of the corrugated tube 1.

Thus, FIG. 4 shows that the wall sections 6, which form the radially projecting areas in the circumferential corrugation 4, have a breadth B, as seen in the axial direction of the corrugated tube 1, which is greater than the breadth b of the adjoining wall sections 5 of softer material on both sides in the circumferential direction, which sections form the radially recessed sections in the circumferential corrugation 4.

Thus, along each peak 2 and as seen in the circumferential direction thereof, each wall section 6 of harder material opens on both sides via a respective radially directed axial setback a into the facing side flank 8 of the adjacent wall section 5 made of softer material, as shown in FIG. 4. When a corrugated tube 1 of construction as shown in FIGS. 1 to 4 bears with its outer surface against any frictional counter surface, it is easily understandable that only the projecting surfaces of the wall sections 6 projecting radially at the outer circumference can come into contact with the counter surface, while the radially recessed wall sections 5 cannot come into contact with this counter surface. If a relative movement takes place between the counter surface and the regions of the wall sections 6 in contact therewith, this means that only wall sections 6 of harder material and thus with greater abrasion resistance than the adjacent wall sections 5 made of softer material participate in the friction process, so that only the harder plastic material of the wall sections 6 determines the abrasion resistance of the corrugated tube 1 against a frictional counter surface.

On the other hand, the softer material of the radially recessed wall sections 5 determines the flexible behavior of the entire corrugated tube 1 and can be designed accordingly without the harder material of the wall sections 6 having an unfavorable effect on the overall flexibility of this corrugated tube 1.

Figure 6:
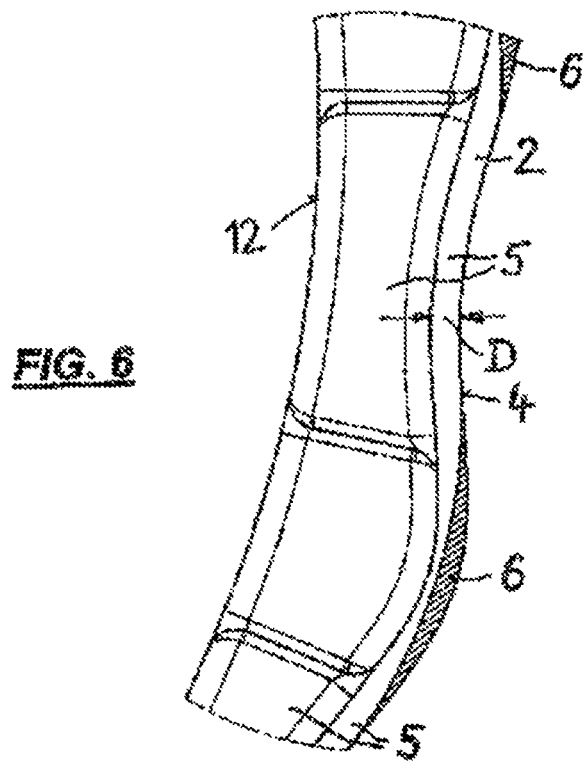
FIG. 6 is an enlarged detail view of the detail C from FIG. 5.

A somewhat different embodiment of a corrugated tube 1 is shown in a front view in FIG. 5, wherein the detail C indicated there is shown in an enlarged detail representation (as a sectional representation) in FIG. 6.

The embodiment shown here differs from that shown in FIG. 1 in that the wall sections 6, which represent the projecting regions of the corrugation 4, no longer extend radially over the entire thickness D of the peak 2, but radially in these regions only up to part of its overall thickness D, as shown in hatching in the enlarged detail of FIG. 6, while the softer material of the wall sections 5 is shown unhatched.

In this case, only the area in which the wall sections 6 only partly penetrate into the wall thickness D of the peak (areas shown in hatching in FIG. 6) consists of harder material, while the entire rest of the wall thickness D consists of the softer material of the wall sections 5.

This embodiment makes it possible to achieve a particularly great flexibility of the corrugated tube 1, this being greater than in the embodiment shown in FIGS. 1 to 4.

However, as in the embodiment of FIGS. 1 to 4, it is furthermore ensured that, again, only the radially projecting wall regions 6 of harder material come into frictional contact with a counter surface. In the embodiment of FIGS. 5 and 6, the harder material of the wall sections 6, which is available for a friction process, overall extends radially over a smaller radial thickness than in the case of the first exemplary embodiment of FIGS. 1 to 4, so that the construction of a corrugated tube 1 as shown in FIGS. 5 and 6 is then of particular interest if the expected friction processes can be expected to result in somewhat lower abrasion.

Suitable flexible plastics used as the material for the wall sections 5 and 6 are, for the softer material, one with a Shore A hardness in a range of preferably 10 to 70, and, for the harder material of the wall sections 6, one with a Shore D hardness in a range of preferably 40 to 90.

Preference is given to using, for the harder material, a plastic made of polypropylene (PP) or a suitable polyamide (PA), e.g. PA 12 or PA 612, and, for the softer material, one made of a suitable thermoplastic elastomer (TPE).

The corrugated tubes 1 with a construction as shown in FIGS. 1 to 4 or with a construction as shown in FIGS. 5 and 6 are very flexible because of the wall sections 5 made of softer plastic distributed over their periphery, without this flexibility being influenced by the wall regions 6 made of harder plastic. Rather, the wall regions 5 made of the softer plastic can be selected and configured in a very targeted manner with regard to the desired flexibility.

By contrast, the wall regions made of harder plastic, which form the radially projecting sections of the peaks, as seen over the circumference of the corrugated tube, are responsible for friction processes which are caused by moving surfaces bearing against them, wherein these can also be designed very specifically with regard to the desired friction properties and the abrasion resistance, by means of a suitable material selection, without the wall regions 5 having a material of lower hardness being influenced by these properties.

The invention claimed is:

1. A corrugated tube made of flexible plastic material for encasing lines, having circumferential peaks and troughs distributed in alternating succession over an axial length of the corrugated tube, wherein the peaks are each provided with a corrugation along an outer circumference of the peaks, as seen in cross section perpendicular to a longitudinal axis of the corrugated tube, the corrugation alternately forming radially projecting regions and radially recessed regions in a circumferential direction of each of the peaks, and the corrugated tube comprises wall sections adjacent to one another in the circumferential direction and extending axially over the length of the tube, the wall sections including first axial strips forming the radially projecting regions in the corrugation and second axial strips forming the radially recessed regions, the first axial strips and the second axial strips of the wall sections repeatedly formed, circumferentially alternately, of materials of different hardnesses.

2. The corrugated tube as claimed in claim 1, characterized in that the first axial strips forming the radially projecting regions are each formed of a harder material which is harder than a softer material of the second axial strips forming the radially recessed regions.

3. The corrugated tube as claimed in claim 2, characterized in that, for each peak, a breadth of the peak for the radially projecting region in an axial direction of the corrugated tube is greater than a breadth of the peak for the radially recessed region in the axial direction.

4. The corrugated tube as claimed in claim 1, characterized in that the wall sections each form an entire wall thickness of the corrugated tube in a radial direction.

5. The corrugated tube as claimed in claim 1, characterized in that the first axial strips are formed of a harder material and extend in a radial direction only over a part of a wall thickness of the corrugated tube, while a remainder of the corrugated tube is formed of a softer material.

6. The corrugated tube as claimed in claim 1, characterized in that a softer material from which the first axial strips or the second axial strips are formed has a Shore A hardness in the range from 10 to 70.

7. The corrugated tube as claimed in claim 1, characterized in that a harder material from which the first axial strips or the second axial strips are formed has a Shore D hardness in the range from 40 to 90.

8. The corrugated tube as claimed in claim 1, characterized in that a number of the wall sections formed of a softer material and of a harder material is 12 or 16, respectively.

9. The corrugated tube as claimed in claim 1, characterized in that a harder material of the first axial strips or the second axial strips includes a polypropylene or a polyamide.

10. The corrugated tube as claimed in claim 1, characterized in that a softer material of the first axial strips or the second axial strips includes a thermoplastic elastomer.

11. The corrugated tube as claimed in claim 1, characterized in that the wall sections lie parallel to one another in the circumferential direction.

\* \* \* \* \*